United States Patent [19]

Cadwell

[11] Patent Number: 5,019,783
[45] Date of Patent: May 28, 1991

[54] PRECISION TRANSDUCER CIRCUIT AND LINEARIZATION METHOD

[75] Inventor: Robert M. Cadwell, Los Altos, Calif.

[73] Assignee: Dresser Industries, Inc., Dallas, Tex.

[21] Appl. No.: 304,359

[22] Filed: Jan. 30, 1989

[51] Int. Cl.$^5$ .......................................... G01R 27/26
[52] U.S. Cl. ..................................... 324/662; 73/724; 324/678; 324/679
[58] Field of Search ............ 326/61 R, 60 R, 60 CD, 326/60 C, 661, 658, 662, 671, 678, 679; 73/718, 724

[56] References Cited

U.S. PATENT DOCUMENTS

| | | | |
|---|---|---|---|
| 4,054,833 | 10/1977 | Briefer | 324/679 |
| 4,092,696 | 5/1978 | Boesen et al. | 361/283 |
| 4,093,915 | 6/1978 | Briefer | 324/679 |
| 4,094,199 | 6/1978 | Holdren et al. | 73/517 B |
| 4,122,708 | 10/1978 | Maier | 73/136 A |
| 4,193,063 | 3/1980 | Hitt et al. | 324/60 C D X |
| 4,211,971 | 7/1980 | Kobayashi et al. | 324/61 R X |
| 4,292,632 | 9/1981 | Yeakley | 324/61 R X |
| 4,295,376 | 10/1981 | Bell | 73/724 |
| 4,336,718 | 6/1982 | Washburn | 73/517 B |
| 4,386,312 | 5/1983 | Briefer | 324/661 |
| 4,392,382 | 7/1983 | Myers | 73/724 X |
| 4,392,383 | 7/1983 | Bauerlen et al. | 73/724 |
| 4,398,194 | 8/1983 | Johnston | 324/60 C X |
| 4,509,007 | 4/1985 | Barsotti et al. | 324/60 C |
| 4,584,885 | 4/1986 | Cadwell | 73/862.61 |
| 4,791,352 | 12/1988 | Frick et al. | 324/60 CD |

*Primary Examiner*—Reinhard J. Eisenzopf
*Assistant Examiner*—Robert W. Mueller

[57] ABSTRACT

A method and apparatus for determining the extent of deflections of a movable diaphragm in a capacitive displacement type transducer. The transducer circuit is connected to a three terminal capacitive type transducer, and produces an output which is essentially of stray capacitances, circuit component tolerances and changes, and dimensional changes in the transducer elements caused by temperature changes. This is achieved by providing an output which is representative of the difference in the capacitances of the two transducer capacitors, nominalized by dividing by the sum of the capacitance reciprocals. The output of the transducer circuit thus represents the extent of the diaphragm deflection with all other transducer and circuit parameter variations removed.

25 Claims, 3 Drawing Sheets

PRECISION TRANSDUCER CIRCUIT AND LINEARIZATION METHOD

TECHNICAL FIELD

The present invention relates in general to circuits and techniques for converting transducer output indications into corresponding electrical signals, and more particularly to the accurate measurement of capacitance produced by the deflection of movable members between fixed conductor plates as used in microphones, pressure sensors, accelerometers and other transducers. The present invention also relates to techniques for constructing transducers with linear pressure-capacitance characteristics.

BACKGROUND OF THE INVENTION

Transducers comprise a family of sensors which are responsive to an input for providing a different type or term of output. For example, pressure sensor transducers are responsive to an input fluid pressure to deflect a diaphragm and provide an output change in capacitance. Sophisticated circuits are utilized to very accurately transform the small changes in capacitance into corresponding electrical signals which are representative of the change in input pressure. While it would be highly desirable to sense the amount of diaphragm deflection directly, such small changes in miniature transducers are often at the atomic level and thus not measurable with practical equipment. As a result, it is more practical to measure small changes in capacitance of the transducer and correlate the result thereof to a change in diaphragm deflection, and thus to changes in pressure, acceleration, etc., to which the transducer is responsive.

Deflections of clamped diaphragms in capacitive displacement type transducers, in relation to fixed plates produce corresponding changes in the capacitance of the members. In practice, such a structure includes two capacitors, one (C1) existing between the first plate and the diaphragm, and the second capacitor (C2) existing between the second plate and the diaphragm. As the diaphragm moves toward one plate or the other in response to pressure changes, the capacitances between the diaphragm and the two plates change accordingly, albeit in a nonlinear manner. Therefore, by measuring the change in the capacitance between the diaphragm and the plates, the amount of deflection can be measured.

Transducer circuits currently available attempt to directly measure the difference in the capacitances (C1−C2) of the transducer and produce an output which is proportional to the difference. However, the deflection of the transducer diaphragm is generally not linear with respect to C1−C2, and therefore complicated and expensive methods and devices are often required to both correct the nonlinearities and to compensate for other transducer or circuit inaccuracies.

Further, as transducer devices become miniaturized, the stray capacitance becomes very significant, often being larger than the capacitance of the transducer capacitors C1 and C2 being measured. This can be appreciated in view that with miniature transducers, the total capacitance may be in the neighborhood of several picofarads, with changes in the capacitance due to pressure changes being a matter of femtofarads.

Further still, traditional circuit designs require the use of precision and costly components. This can be realized as the differences of a few percent in the values of the resistors, capacitors, and other components can introduce unacceptable errors in the conversion of transducer capacitance to electrical output signals. Also, inaccuracies can occur due to thermal effects on the transducer and from changes in the dielectric constant between the plates and the diaphragm due to humidity, smoke, or other fluids passing between the diaphragm and the capacitor plates. Thus, traditional transducer circuits are not readily adapted for use in miniature transducers, because the errors introduced are often too great to make the transducers of practical value as precision conversion devices. As a result, the output electrical signal, converted from C1−C2, is not linear with respect to the displacement of the diaphragm, and thus accuracy is compromised.

The trend in transducer manufacture, at least with the capacitive displacement type transducer, is reduce the size of the device. This is due primarily to the fabrication of silicon diaphragms according to current silicon processing techniques. Hence, by reducing the size of the silicon diaphragms, many more diaphragms can be fabricated from a silicon wafer, thereby increasing yield. However, smaller diaphragms experience smaller deflections for a given pressure change, and thus smaller capacitance changes which must be sensed by associated electrical circuits. The demands on such circuits require high sensitivity, without compromises in circuit performance due to temperature, parasitic influences or circuit components.

It is also highly desirable to provide a transducer and associated conversion circuit which exhibits a linear relationship between pressure or other input energy, and the output electrical signals. However, standard clamped diaphragm transducers have an inherent nonlinearity between pressure and capacitance. Thus, even with a highly linear circuit, other compensation techniques must be utilized to provide overall linearity. Any transducer or circuit stray capacitance further exacerbates the linearity problem. Costly measures have been undertaken in the circuits to compensate for the nonlinearities. With nonlinearities characterized in the third order, or more, circuit fixes become prohibitively expensive.

It can be seen that a need exists for a transducer system in which a miniature transducer and associated circuit provides an enhanced accuracy and is not sensitive to component tolerances and stray capacitance. Another need exists for a transducer circuit which is cost effective and easily manufactured. Yet another need exists for a technique which corrects for nonlinearities between diaphragm deflection and capacitance change, thereby providing a transducer system with much improved accuracy.

SUMMARY OF THE INVENTION

According to the invention, there is disclosed a circuit and a technique for measuring capacitance changes in response to deflections of the transducer diaphragm, all independent of stray capacitances, of component tolerances of the circuit elements and of changes in the characteristics of both the transducer and circuit due to temperature. This feature is achieved by sensing the capacitance changes between a diaphragm and fixed plates of the transducer and processing the signals in a common channel such that linearity is maintained and any changes not occasioned by diaphragm deflections are cancelled, thereby providing an electrical output which changes only in response to changes in diaphragm deflections.

According to one embodiment of the circuit of the invention, a signal is generated which represents the difference between the reciprocals of each of the transducer capacitors C1 and C2, such that the output signal conforms to the following relationship:

$$\frac{1}{C1} - \frac{1}{C2}$$

According to another embodiment of the invention employing feedback, the output signal represents the difference between the reciprocals of the transducer capacitors, divided by the sum of the reciprocals of the capacitors, such that the output signal represents:

$$\frac{\frac{1}{C1} - \frac{1}{C2}}{\frac{1}{C1} + \frac{1}{C2}}$$

which is equivalent to:

$$\left(\frac{C2 - C1}{C1 + C2}\right).$$

Therefore, the output signal may represent the difference in the transducer capacitances divided by the sum of the capacitances.

Although an embodiment which provides an output signal representative of $$\left(\frac{1}{C1} - \frac{1}{C2}\right)$$

maintains a linear relationship with the deflection of the transducer diaphragm, a preferred embodiment is one in which the output signal is representative of $(C2-C1)/(C1+C2)$. The nominalization, i.e., dividing the capacitance difference by the sum, drastically reduces thermal and other scaling factors of the transducer which are present in traditional circuits which measure only the difference between C1 and C2. Such errors are thus present in transducer circuits which measure the difference of reciprocals without nominalization.

The output signals defined above may be generated by many different circuits. For example, and as discussed more fully below, a number cf circuits using differentiators, integrators, sample and hold circuits, and feedback may be used. It is also anticipated that measurement of the transducer capacitances may be carried out directly by a digital processor producing the output signals as a result of calculations made from the reciprocals of the transducer capacitances.

In accordance with another feature of the invention, a technique is disclosed for selecting various transducer parameters so as to achieve linear pressure-capacitance characteristics. According to the technique, a transducer diaphragm thickness is selected in accordance with a diaphragm to plate gap such that the nonlinear deflection effects offset the capacitive effects, thereby resulting in the noted linear relationship.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
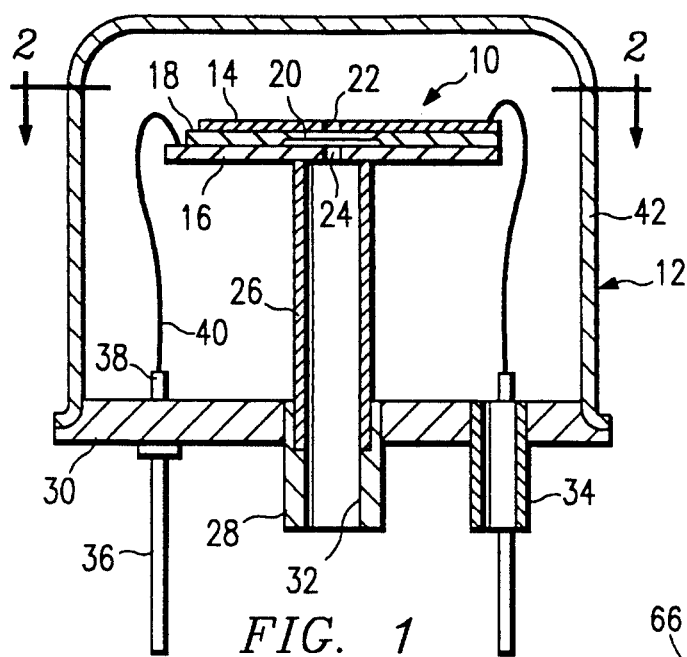
FIG. 1 is a simplified schematic representing a cross section of, a capacitive displacement type of transducer.

Referring to FIG. 1, there is depicted in simplified form a portion of a transducer of the type having a first plate 10, a second plate 12, and a moveable diaphragm 14 disposed therebetween. The capacitive transducer structure generally comprises a pair of spaced apart conductive plates formed on glass insulator supports 16 and 18, with a piston or clamped semiconductor flexible membrane 14 mounted for movement therebetween. Three conductors 20–24 provide electrical connections to the plates 10 and 12 and the movable diaphragm 14. Holes 26 and 28 formed in the support structure of the transducer allow pressure differentials to deflect the membrane diaphragm 14. The deflection of the diaphragm 14 causes a change in the capacitance C1 and C2 of the transducer. The sensing of the change in capacitance can be correlated to the extent of the diaphragm deflection, and thus to the fluid pressure which caused such change. A miniature transducer of such type is described in copending U.S. application entitled, "High Sensitivity Miniature Pressure Transducer," Ser. No. 304,344, filed concurrently herewith and bearing attorney docket No. B-27320. The disclosure of the noted application is incorporated herein by reference.

The parameter of interest is the displacement of diaphragm 14, defined by a distance x. This distance x can be determined by measuring the capacitances of diaphragm 14 to the respective plates 10 and 12. As can be appreciated x=d1−d2, where d1 and d2 define the distance or gap of each plate 10 and 12 to the diaphragm 14. According to well known relationships, the capacitance is a function of the area and the gap between the plates 10 and 12 and the diaphragm 14. Ignoring various constants, and assuming equal plate areas:

$$\text{capacitance} = \text{area}/\text{distance}$$

so $d1 = \frac{a}{C1}$, $d2 = \frac{a}{C2}$

Thus, $x = d1 - d2 = \frac{a}{C1} - \frac{a}{C2}$

To maintain the linearity of the system, the measurement of diaphragm displacement must consider the difference of the reciprocal capacitances.

According to other well known principles, if a capacitor is charged with a constant current, the voltage across the capacitor increases linearly with time, producing a voltage ramp of constant slope:

$$\frac{1}{c} = \frac{e}{it}$$

Since e/t defines a slope, $$\frac{1}{c} = \frac{1}{i} \times \text{slope}.$$

If, as noted above, the current, i, is held constant, $$\frac{1}{c} = \text{constant} \times \text{slope}.$$

A circuit embodying the principles and concepts of the invention is described below for measuring the slope of a capacitor voltage ramp derived by a constant charging current, and for responding to the difference of the measurements for the two transducer capacitors C1 and C2. Stray capacitance effects can effectively be eliminated by providing transducer connection points to the circuit at low impedance nodes. Measurement current related to the transducer capacitance change should not be utilized to charge unknown stray capacitances and thus reduce or alter the actual measurement current. Further, the measurement of the voltage across the transducer capacitance should not affect the result.

Figure 2:
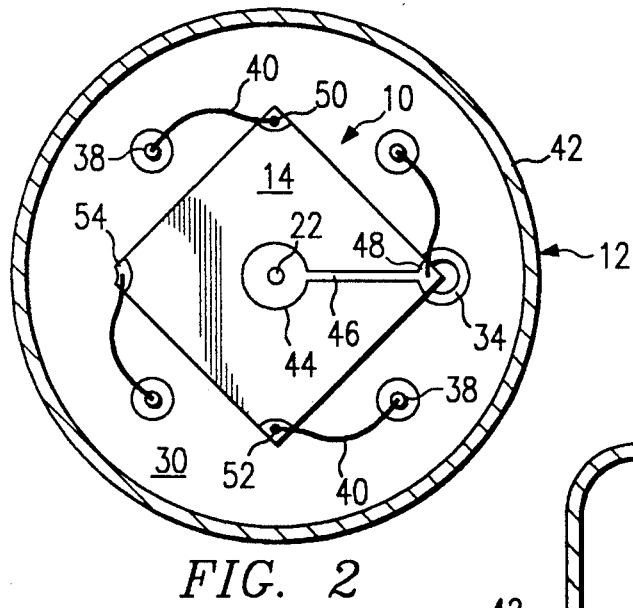
FIG. 2 is a circuit diagram showing an embodiment of the invention in which a first stage integrator, followed by a differentiator, is used to sequentially generate representations of capacitances C1 and C2 of the transducer.

In the circuit embodiment shown in FIG. 2, the reciprocal capacitances of the transducer are measured sequentially by the use of switching circuits adapted for alternately switching the transducer capacitances C1 and C2 so that the resulting signals can be alternately processed in a common signal channel. The transducer capacitance is shown generally as reference character 30. The common lead 22 of the transducer is connected to the diaphragm 14, as well as to the inverting input 32 of a high gain amplifier 34. The amplifier 34 is of the differential input type, with the noninverting terminal connected to circuit ground to establish the other input at a virtual ground, e.g., zero impedance, with appropriate feedback. The transducer capacitor plates 10 and 12 are alternatively switched to the amplifier output 36 and the virtual ground to provide a capacitive feedback and thereby function as an integrator.

Figure 3:
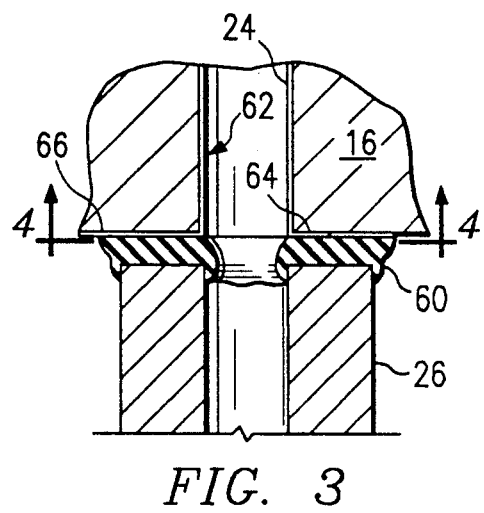
FIG. 3 comprises a series of waveforms of the circuit of FIG. 2.

The timing diagram of FIG. 3 depicts the circuit operation during one measurement cycle, which is composed of two similar half-cycles. The various voltage levels shown in the first half cycle depict control over the switches shown in the associated positions noted in FIG. 2. For purposes of understanding, the circuit is shown using mechanical switches, however, in practice, solid state switching devices would be employed. During the first part of each half cycle, switch 38 is operated so as to apply a reference voltage +Vdown through resistor 40 and force a constant current through the transducer capacitance (C1 or C2) which is then switched to the output 36 of amplifier 34. During a major portion of the first half-cycle, switch 42 is closed to provide a C1 capacitor feedback between the input and output of the integrator amplifier 34, while switch 44 is closed to discharge capacitor C2 in preparation of the next half cycle. During the first half cycle when C1 is connected across the integrator amplifier 34, switches 46 and 48 are open, as shown. During a latter part of the first half cycle, switch 38 changes positions to momentarily facilitate discharging capacitor C1. Stray capacitance to ground associated with the transducer diaphragm 14 has little effect on the circuit since the connection at this point, at virtual ground, cannot change in voltage. Stray capacitance associated with connecting leads or the transducer capacitor plates 10 and 12 is driven by the output of integrator amplifier 34 and does not affect the voltage measured across transducer capacitor plates 10 and 12.

The output of integrator amplifier 34 during the first portion of the first half-cycle is a linearly decreasing voltage ramp, as shown by waveform 50 in FIG. 3. The negative slope 50 is proportional to the reciprocal of the transducer capacitance C1 which is switched across the integrator amplifier 34. A DC signal level representative of the slope 50 of this ramp voltage is generated by a differentiator circuit. A differentiator circuit, comprised of amplifier 52, series capacitor 54 and resistor 56, parallel feedback resistor 58 and diode 60, produces an output signal having voltage level corresponding to the slope 50 of the ramp during this phase of the first half-cycle. This voltage level 62 is shown in FIG. 3, and is sampled and retained by sample and hold circuit 64. While not shown, the sample and hold circuit 64 is responsive to the output of the differentiator amplifier 52 during the first half cycle, while the sample and hold circuit 66 is responsive to the output of differentiator amplifier 52 during the other half cycle. The input driving voltage Vdown is switched to the integrator amplifier 34 for a period of time sufficient such that the negative slope 50 stabilizes, and the voltage level 62 is established and is captured by the sample and hold circuit 64. The DC voltage level 62 corresponds to the reciprocal of transducer capacitance C1.

A comparator 68, timer and other control logic in logic circuit 70, control the various switches and circuits to terminate this first phase of the first half-cycle after a fixed period of time, wherein the next phase begins. During a second phase of first the half-cycle, switch 38 switches momentarily connects the reference voltage −Vup to the input resistor 40. This causes the output of integrator amplifier 34 to linearly increase back towards zero volts, as shown by numeral 72 in FIG. 3. At this time comparator 68 signals logic circuit 70 and the first half cycle is completed. No measurement is made by the circuit during this restore phase, as the voltage across the corresponding transducer capacitance C1 and thus the stored charge, is restore to a zero value. This positive slope 72 can be very steep so that little time is taken, and the next half-cycle is ready to be carried out.

In commencing the initiation of the second half cycle, switches 42-48 all reverse and switch 38 is reconnected to Vdown. An identical half-cycle is then carried out to generate a stored DC voltage corresponding to the reciprocal for the other transducer capacitance C2. The negative slope produced by the integrator amplifier 34 is shown in FIG. 3 as numeral 74. Since the diaphragm 14 of the transducer is assumed to have moved from a mid position in response to a pressure, the capacitances C1 and C2 are unequal, thereby resulting in different slopes 50 and 74. Because the integrator amplifier 34 is connected as an integrator, the slopes of the voltage waveforms 50 and 74 very accurately correspond to the reciprocals of the values of the capacitances C1 and C2. The second half cycle results in a second DC voltage level 76 produced from the output of differentiator amplifier 52 which is sampled and retained by another sample and hold circuit 66. Hence, separately stored DC voltages are representative of the reciprocals of the transducer capacitances C1 and C2.

The difference of the DC voltages of the two samples, stored from the corresponding half-cycles by sample and hold circuits 64 and 66, is obtained and stored as a value by a difference circuit 78. The 1/(C1−C2) voltage is the electrical output of the system which corresponds to the pressure that deflected the diaphragm 14.

In this embodiment of the transducer circuit, the average net electrical charge on the two transducer capacitances C1 and C2 is substantially equal, because the time for the negative slope measurement is the same for both halves of the cycle. This is assured by using the same timer for both half-cycles. Thus, since the current and time are the same for both half-cycles, the total charge stored by the transducer capacitances C1 and C2 is the same. It is to be noted that the current used to return the capacitor charges to zero in this embodiment is also the same for both half-cycles, so that no error is introduced during these phases. The sample and hold circuits 64 and 66, as well as the difference circuit 78 are of conventional design and need not be detailed here.

In another embodiment of the invention, enhanced performance may be obtained when the circuit elements are connected so as to be ratiometric. Although not functionally necessary, in practice this feature allows increased stability due to the elimination of many critical circuit components, thereby correcting transducer variations and preventing these effects from degrading the overall system performance.

Referring again to FIG. 2, the signal level from the output of differentiator amplifier 52, representing the reciprocal transducer capacitance during the first phase of each half-cycle, is dependent on many of the parameters and circuit components in the signal path (Vdown, resistor 40, capacitor 54, resistor 58), even assuming ideal amplifiers and switches. The output of differentiator amplifier 52 is also dependent on the actual values of the transducer capacitances, as is desired. Thus, if the dimensions of the transducer were to change, either in plate-to-plate distance, or in plate area, the output of amplifier 52 would change during each half-cycle, as would the difference produced by the difference circuit 78.

Therefore, in another embodiment, there is generated a parameter which is dependent on all system parameters and component variations in the same manner and to the same extent as the measurement of the difference of the reciprocal transducer capacitances. This parameter is the sum of the reciprocal capacitances C1 and C2 of the transducer. Such parameter is employed to normalize the output of the system so as to be insensitive to changes, except for changes in the capacitances C1 and C2 caused by diaphragm deflections.

The total capacitance of the transducer is related to the capacitance of C1 and C2 as follows:

$$\frac{1}{C_{total}} = \frac{1}{C1} + \frac{1}{C2}$$

This is the relationship for capacitances connected in series. Note that 1/Ctotal is independent of the position of the diaphragm and, in fact, does not change even when the diaphragm is moved or deflected. If the physical dimensions of the transducer were to change, such as because of temperature, the factors 1/C1 and C2 would change proportionately, as would 1/Ctotal. Likewise, if the physical dimensions cf the transducer were to change in such a manner as to change the plate areas, the values C1, C2 and Ctotal would again change proportionately.

Therefore, the quantity $$\frac{\frac{1}{C1} - \frac{1}{C2}}{\frac{1}{C1} + \frac{1}{C2}}$$

is independent of the plate-to-diaphragm distance and plate area scaling dimensions of the transducer. That is, if the difference of the transducer reciprocal capacitances, representing the position of the diaphragm 14, is divided by the sum of such values, the result is independent of transducer scale factors, and therefore, symmetrical dimensional changes caused by temperature variations and other matters will have little effect on the result.

Circuit parameters in a common signal path also behave similarly to the circuit scale factors. Thus, since a common signal path or channel of amplifiers 34 and 52 is used for both half-cycles, the affect of the scale factors on the measurement of both reciprocal capacitances is proportionate. Therefore, the division of the difference of the capacitances C1 and C2 by the sum thereof is highly effective in eliminating the effects of circuit parameter variations and in eliminating the effects of symmetrical transducer variations.

One circuit embodiment which achieves substantially ratiometric operation is realized by adding circuitry to that of FIG. 2 to provide a sum of the capacitances Cl and C2, as well as the difference output, and dividing the difference by the sum. However, rather than requiring an actual mathematical division process at the output, which is one alternative, it is more efficient to produce substantially the same result via direct feedback.

If the denominator of the above noted relationship is simply held constant, mathematical division is not necessary. That is, if the measured sum of the transducer reciprocal capacitances is forced to be constant, the scale factor of the output will be independent of common circuit parameters and symmetrical transducer variations. This can be achieved by varying any parameter in the signal path which directly controls the signal path gain. A convenient parameter to vary is the reference voltage Vdown, which determines the charging current of transducer capacitances C1 and C2, and thus the associated ramp slopes 50 and 74.

Figure 4:
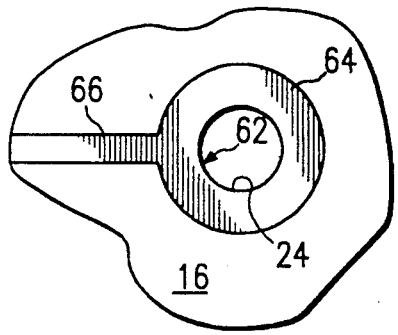
FIG. 4 is a circuit diagram showing an alternative embodiment of the circuit shown in FIG. 2, wherein the sum of the capacitances is fed back to the input, thereby nominalizing the output function.

FIG. 4 shows a circuit topology embodying the foregoing principle. A summing circuit 80 and an integrator 82 constructed with differential amplifier 84, input resistor 86, and feedback capacitor 88 have been added to the circuit of FIG. 2. The summing circuit 80 is of conventional design, obtaining the reciprocal capacitance values from the respective sample and hold circuits 64 and 66. The sum of the reciprocal transducer capacitances is compared to a reference voltage Vref connected to the noninverting input of the amplifier 84. The output of amplifier 84, replacing the voltage Vdown of FIG. 2, assumes a value which will cause the sum to equal the reference, and thus remain constant.

The circuitry after the differentiator amplifier 52 processes the measurements of alternate half-cycles separately as described above. Therefore, parameter variations injected into the transducer circuit after this point are not in the common signal path and are not removed with the feedback provided by integrator 82.

Figure 5:
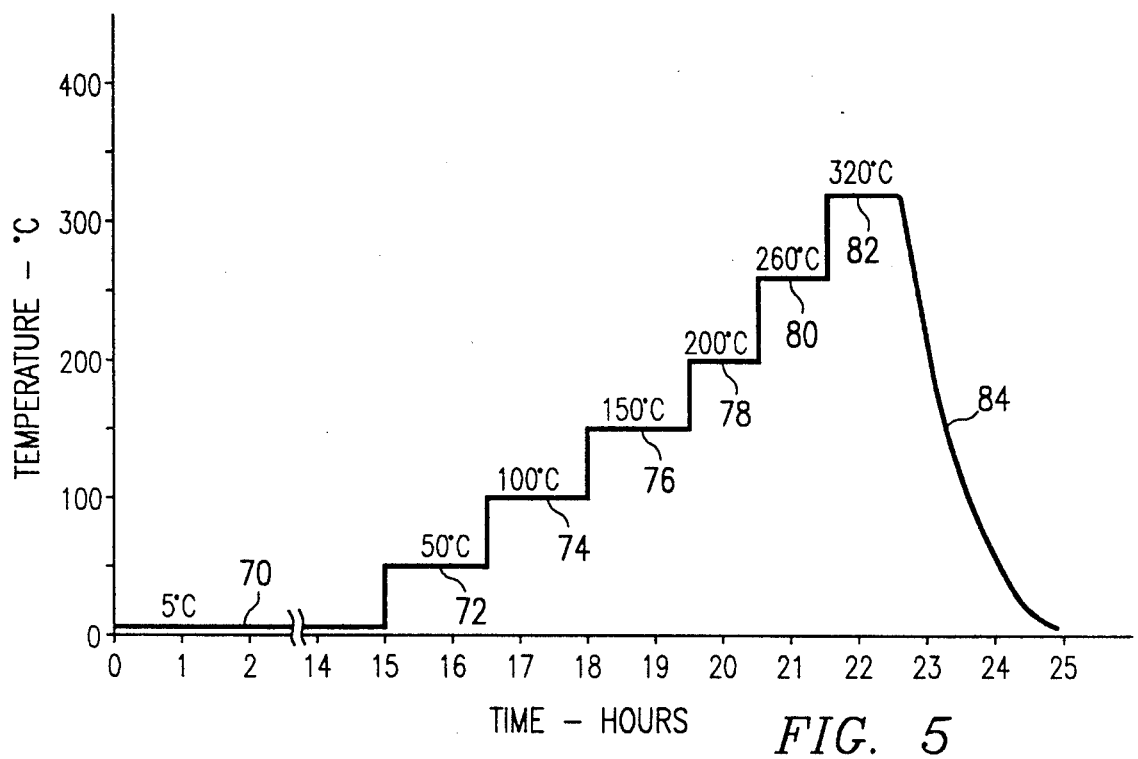
FIG. 5 shows an embodiment of peak detection, sample, and hold circuitry which may be used in various embodiments of the invention.
Figure 6:
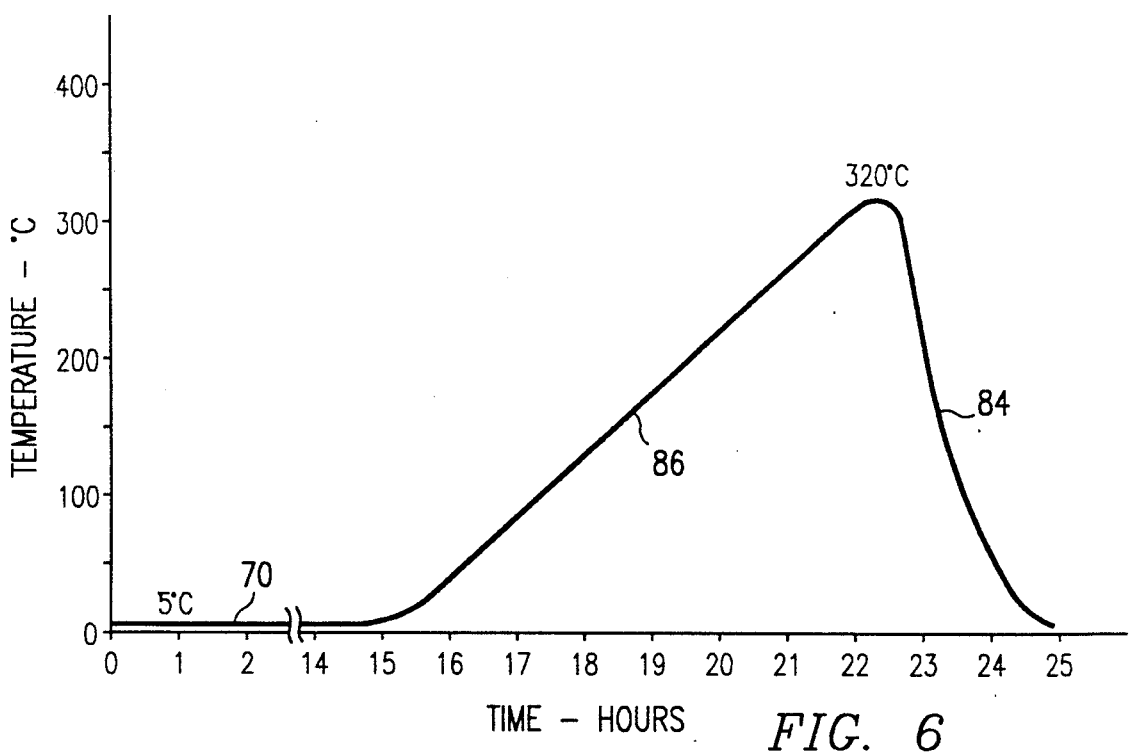
FIG. 6 depicts a series of electrical waveforms depicting the operation of the circuit of FIG. 5.

FIGS. 5 and 6 illustrate a circuit topology and timing diagram which further define the sample and hold circuits 64 and 66, the difference circuit 78, the summing circuit 80 and amplifier 84 of FIG. 4. The potential effects of circuit parameter variations caused by factors such as temperature and aging of circuit components have been avoided by using capacitor charging techniques instead of conventional resistor summing techniques.

In FIG. 5 a peak detector circuit 90 is connected to the output of differentiator amplifier 52 and to a sampling circuit 92 and a hold circuit 94. In order to avoid sampling the output of differentiator amplifier 52 while the ramp voltage is in progress, and possibly coupling switching signals into the integrator amplifier 34, the peak detector 90 is utilized to retain the maximum value of the output signal of amplifier 52 until the next half-cycle is initiated. Amplifiers 96 and 98, capacitor 100, resistor 102, and switch 104 comprise the peak detector circuit, where switch 104 resets the peak detector at the beginning of each half-cycle.

During an initial phase of the first half cycle, the switch 104 is closed, as noted from the logic high part of the waveform in FIG. 6. This action discharges the capacitor 100, preparing it for storing the DC voltage output by differentiator amplifier 52. When switch 104 opens, the voltage output by unity gain amplifier 96 charges the capacitor 100 to a peak value. Diode 106 prevents discharge of the capacitor 100 back through the output of amplifier 96, thus preserving the peak voltage until resetting of switch 104 in the next half cycle. Amplifier 98 functions as a unity gain buffer for coupling the peak voltage stored in capacitor 100 to the sample circuit 92.

The sample circuit 92 comprises a capacitor 108 connected between the output of amplifier 98 and the noninverting input of a sample amplifier 110. A switch 112 is actuated to connected the capacitor 108 to ground and charge it to the peak voltage output by the peak detector 90. The inverting input of the sample amplifier 110 is connected to the output thereof to provide unity gain. The hold circuit 94 constitutes a series switch 114 connected between the output of the sample amplifier 110 and the noninverting input of a hold amplifier 116.

A capacitor 118 is connected between circuit ground and the inverting input of the hold amplifier 116. Much like the sample amplifier 110, the hold amplifier 116 is connected for unity gain. The output of the hold circuit 94 defines the output of the transducer circuit, and more particularly provides the difference of the reciprocals of the transducer capacitances C1 and C2.

To obtain the difference between the C1 and C2 capacitance slope measurements of the two half-cycles, capacitor 108 of the sample circuit 92 is charged to the C1 capacitance peak voltage stored by the peak detector 90 during the first half-cycle. The charging of capacitor 108 is initiated by the closing of switch 112 during such half-cycle to place the full C1 charge on the capacitor 108. During the second half-cycle when the peak detector 90 is outputting the peak voltage corresponding to the C2 capacitance, switch 112 is opened, thereby driving the C2 charge in series with the C1 charge already stored on capacitor 108. This results in a voltage level at the input of sample amplifier 110 which is the difference in the transducer C1 and C2 charges. The difference voltage is shown as waveform 120 of FIG. 6. This voltage is stored on capacitor 118 by closing switch 114 at a later point in the second half cycle. The difference voltage at the output of the circuit remains constant during the subsequent updating of capacitor 108 while switch 114 is open. Buffer 116 delivers this difference signal to the output of the system. The actual values of capacitors 108 and 118 are not critical, and no scaling factors have been introduced in the process of deriving the required difference voltage signal.

The summing of the voltages corresponding to the reciprocals of the transducer capacitances C1 and C2 is carried out by sample circuit 122 and hold circuit 124. With regard to the sample circuit 122, switches 126, 128 and 130 are arranged with respect to capacitor 132 to allow a voltage corresponding to the reciprocal of the transducer capacitance C1 to be stored thereacross during the first half cycle, and a voltage corresponding to the reciprocal of the transducer capacitance C2 to be added thereto during the next half cycle. The sum signal is produced by first closing switches 126 and 130 and charging capacitor 132 during the first half-cycle to charge one plate of capacitor 132 to the reciprocal C1 capacitance voltage. During the next half cycle, switches 126 and 130 are opened, switch 128 is closed, and the other plate of capacitor 132 is charged to the reciprocal C2 capacitance voltage. This effectively produces the sum voltage across the capacitor 132 as an input to sample amplifier 134 which, in turn, stores the sum voltage level on capacitor 136 through closed switch 138. As before, no scaling factors have been introduced, and the sum voltage signal is independent of the values of capacitors 132 and 136. The sum voltage signal 140 is shown in FIG. 6. As can be seen from the waveforms, the transducer capacitance C1 is greater than C2, meaning that the diaphragm 14 has deflected toward plate 10.

The overall timing diagram in FIG. 6 shows the sequence of events. The apparent overlapping of activities is utilized to minimize circuit complexity and allow the fastest possible operation to quickly obtain results indicative of the extent of diaphragm deflection.

The output of the unity gain hold amplifier 142 remains essentially constant, except when the voltage across the storage capacitor 136 changes due to changes in the system, other than deflections of the diaphragm 14. As noted above the summation of the transducer capacitances C1 and C2 does not change with changes in diaphragm deflections, but only changes due to temperature, aging, component tolerances, etc. Hence, by utilizing a feedback of the reciprocal of the summation of the capacitances C1 and C2, the transducer circuit desensitizes the system of variables which do not relate to the parameter to be measured, namely, diaphragm deflection. The output of the amplifier 142 is coupled to the front end integrator amplifier 34, via switch 38. With this arrangement, if a parameter not of interest changes, such as an increase in capacitor plate area, the output of the system does not change so as to indicate a change in the position of the diaphragm, but rather remains constant to indicate no change in diaphragm deflection, unless, of course, the diaphragm does indeed change in response to an external stimulus. In the circuit of FIG. 5, an increase in the transducer plate area due to for example, temperature, causes the output of the amplifier 142 to decrease, thereby providing a reduced Vdown voltage and thereby offset such undesired change.

Linearity of the electronics is determined chiefly by circuit design details and, since ratiometric operation can be achieved as described above, the circuit components are probably limiting factors. It is believed that the gain-bandwidth product of the front-end amplifier 30 will likely dominate linearity considerations, and as the bandwidth or sampling rate of the system is increased, amplifier selection becomes a greater concern. This effect is believed to be quite small at sampling rates of about 5 kHz. While high quality integrated operational amplifiers are available with gain-bandwidth products of 4–8 mHz, discrete amplifier designs may be required if a significantly greater amplifier performance is required. The linearity of the differentiator, peak detector and sampling circuits are assumed to be better than the integrator circuit.

The bandwidth, e.g., sampling rate of the switched circuits, may be restricted in the embodiments employing conventional integrated circuit amplifiers as amplifiers 34 and 52. This limitation may be critical in the differentiator amplifier 52 where stability requirements dictate a rise-time to final value in the order of tens of microseconds. By proper packaging of the electronics and shielding, if necessary, the transients can be minimized.

While the foregoing describes the major circuits for achieving very accurate and reliable operation, certain bias (zero) and span (full scale) adjustments may be utilized to allow for transducer variations and amplifier offsets. Small span adjustments could be achieved with an external reference, thus eliminating such adjustment from the circuit electronics.

If the sampling rate is maintained within reasonable limits of integrated circuit technology, there are substantially no critical components in the design. The logic shown in the present embodiment has been implemented for experimental purposes in single gate structures for simplicity, but any conventional switching techniques such as, for example, TTL, CMOS, etc. will function with equal effectiveness.

Figure 7:
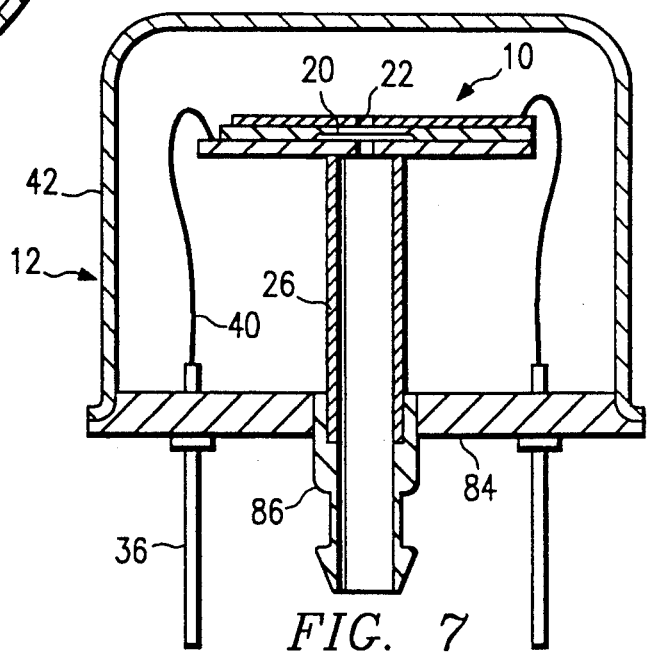
FIG. 7 is an alternative embodiment showing circuitry capable of simultaneously measuring the difference in capacitance during alternate cycles of an input driving function, and simultaneously measuring the total transducer capacitance during every other cycle, using a common channel for such measurements, and also achieving nominalization of the difference measured.

Referring now to FIG. 7, another embodiment of the invention is shown. In this embodiment, rather than measuring the reciprocal value of each transducer capacitor sequentially, and then calculating the sum and difference, the sum of the two transducer capacitors are measured during the same intervals of time, as is the difference of the two transducer capacitors C1 and C2. This allows some of the circuitry to be eliminated, while still realizing the advantage of measuring the two transducer capacitors through a common signal channel so as to reduce errors introduced by variations in the components of the circuit.

In the embodiment shown in FIG. 7, the transducer capacitors C1 and C2, feedback resistor 144, and amplifier 146 are arranged in a differentiator configuration rather than as an integrator 34 as in the embodiment shown in FIG. 2. This rearrangement can be realized when it is understood that the quotient of the reciprocal of the capacitive differences C1−C2 divided by the reciprocal of the sum of the capacitances is identical to (C2−C1)/(C1+C2). The circuit of FIG. 7 is a realization of this simplified expression.

Function or ramp generator 148 includes a first output port 150 producing a triangle waveform, a second output port 152 producing an inverted triangular waveform, and an input port 154 for receiving a feedback voltage. The transducer capacitances C1 and C2 are connected in the circuit such that the diaphragm 14 is connected to the inverting input of amplifier 146, capacitor plate 10 is driven by the triangular wave output by generator port 150, and capacitor plate 12 is driven through switch 156 by the inverted triangular wave produced by function generator output port 152.

Figure 8:
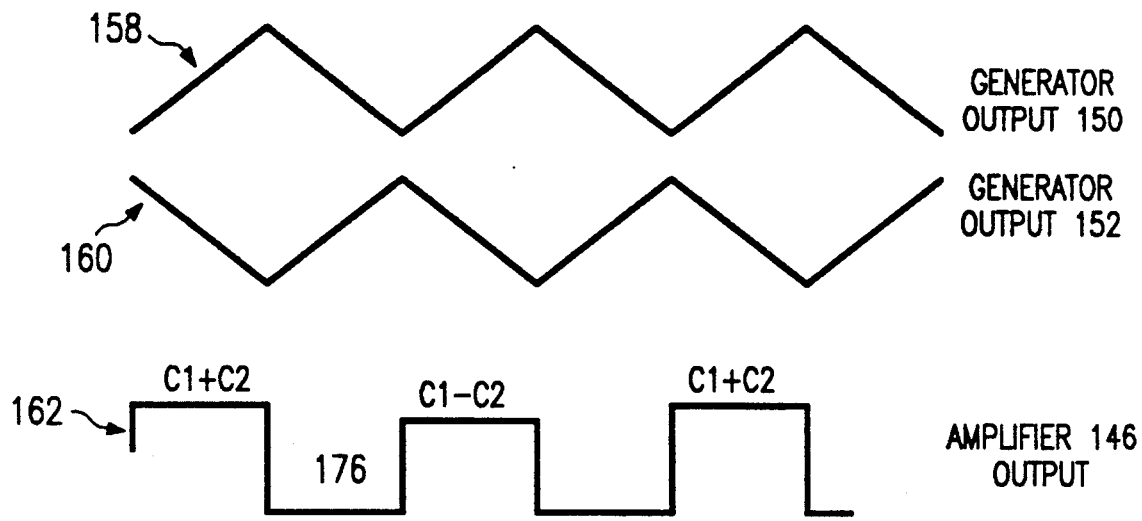
FIG. 8 is a timing diagram showing the operation of the circuit shown in FIG. 7.

The output of function generator 148 at port 150 is a triangle shaped voltage 158 shown in FIG. 8. The inverted triangular wave is shown as reference character 160. To measure the sum of the transducer capacitances C1 and C2, switch 156 is moved to position shown, thereby connecting the transducer capacitors C1 and C2 in parallel. As is well known, capacitors connected in parallel present additive capacitances. This arrangement causes the output of differentiator amplifier 146 to be generally a square wave, the peak-to-peak voltage of which represents the sum of the capacitances of transducer capacitors C1 and C2. Such a voltage 162 is shown in FIG. 8. This voltage signal is then sampled and coupled through switch 164, and stored by a sample and hold circuit 166. Sample and hold circuit 166 produces an output DC voltage defining a sum output signal. The sum signal is fed back to function generator 148 through an integrator amplifier 168, input resistor 170, and feedback capacitor 172. The sum signal feedback output by integrator amplifier 168 is utilized to modify the slope of the triangle waves at the function generator output ports 150 and 152 to correct scaling effects, such as thermal expansions and changes in dielectric constants in the transducer, as well as scaling effects introduced in the remainder of the circuitry in the loop.

During the next cycle, switches 156 and 164 are switched from the positions shown so that the difference voltage generated by the circuit can the coupled to the sample and hold circuit 174. When switched in the manner noted, the transducer capacitors C1 and C2 are connected in series and are driven by both triangular waveforms 158 and 160. By connecting the transducer capacitors C1 and C2 in series and driving such capacitors with opposite polarity ramp signals, the resulting voltage on the diaphragm 14 will be a difference corresponding to the difference between the transducer capacitances. The difference signal is shown in FIG. 8 as reference character 176. The result at the output of differentiator amplifier 146 is substantially a square wave whose peak-to-peak voltage amplitude represents the difference of the capacitance of transducer capacitor C1 and capacitor C2. A significant advantage of this embodiment is that the slope of a ramp signal does not need to be measured. Rather, the ramp signal is used solely as a generator for driving the capacitances C1 and C2 connected to the amplifier 146 for functioning as a differentiator.

As discussed above, since the difference in capacitance value is not linear with he deflection of the diaphragm 14, nominalization by dividing by the sum of capacitances C1 and C2 is carried cut by feedback techniques in order to provide an output which is linear with deflections of the diaphragm 14. The embodiment of FIG. 7 depicts one technique of doing so, however other methods may be devised by those skilled in the art. Indeed, certain applications may not require a high degree of accuracy and thus the feedback path and corresponding circuitry can be eliminated.

The foregoing discloses circuits and techniques for optimizing the conversion of transducer capacitances into corresponding electrical signals. The circuits and techniques can be advantageously employed with piston-type diaphragms, clamped diaphragms, and other transducer applications and measurement parameters. A piston-type diaphragm includes a movable plate, wherein the output is proportional to $1/C1 - 1/C2$, and thus is linear. However, such types of transducers are difficult to fabricate and the electronics are correspondingly complicated. Stray or a parasitic type of capacitances associated with the transducer also degrade the linearity thereof.

More practical types of transducers employ a clamped diaphragm, wherein the peripheral edge of the diaphragm is fixed, and an interior portion thereof is distorted into a curved shape in response to fluid pressures. With a clamped diaphragm, the output is nonlinear, even if the diaphragm deflections are linear with respect to pressure. Capacitance inherent in such diaphragm at the peripheral edge thereof is a major contributing factor to the stray capacitance. Because the clamped diaphragm type of transducer is well adapted for miniaturization, the stray capacitance becomes a significant factor of the total transducer capacitance. A conventional approach in providing a linear output from a clamped diaphragm type of transducer is to restrict the diaphragm displacement to a small fraction of the gap existing between the diaphragm and the fixed plates on either side thereof. While the restriction of the diaphragm deflection tends to improve linearity, the total transducer capacitance is also limited, thereby reducing the dynamic output range of the transducer. In other words, for a given pressure input, the transducer output signal, or sensitivity, is correspondingly reduced. This leads to more complex and expensive circuits to provide a useful dynamic output range, which also give rise to increased noise and a lower signal to noise ratio, increased instability, and other concerns.

In accordance with an important feature of the invention, a technique is disclosed for constructing clamped diaphragm transducers of the balanced differential type exhibiting a linear output without compromising the sensitivity thereof. In addition, by careful selection of the parameters of such type of transducer, improved stability, low noise and large diaphragm displacements can be obtained.

With reference again to FIG. 1, it should be understood that a clamped diaphragm 14 has its peripheral edge fixed with respect to the support structures 16 and 18. Fluid pressures acting on the diaphragm 14 cause an interior portion thereof to deflect toward one plate 10 or the other 12, depending on the differential of the pressure on the opposing sides of the diaphragm. Miniature transducers can be efficiently constructed utilizing silicon diaphragm membranes which may be as small as 300 mils, with a thickness of 3-20 microns. A space formed between the diaphragm 14 and the capacitor plates 10 and 12 defines a gap in which the diaphragm can deflect in response to pressures. The fluid existing within the gap defines a dielectric constant of the insulator between the diaphragm 14 and the conductive capacitor plates 10 and 12.

By varying or changing certain transducer parameters, the response characteristics, and thus linearity, of the transducer can be affected. For instance, the effect on linearity when the transducer diaphragm displacement is a large fraction of the gap as to increase the output slope, i.e., the rate of change of output with pressure, as pressure increases. The effect of linearity on stray capacitance across the transducer elements also increases the output slope, as pressure increases. Such effects may be termed "capacitive effects" and are important in considering techniques for improving the linearity of clamped diaphragm type transducers.

Other parameters have the affect of decreasing the output slope characteristics of the transducer, as pressure increases. For small deflections of clamped diaphragms, the deflection of any given small area thereof is proportional to pressure. In other words, the general curved shape of the diaphragm is constant as the deflection increases with pressure. As the diaphragm deflection continues to increase, however, the rate of increase of deflection with pressure decreases, causing the slope of the resulting transducer output to also decrease. This effect is generally inherent in the properties of thin membrane diaphragms, and especially 15, silicon, where the effect is noticeable for deflections exceeding about ¼ the diaphragm thickness. Hence, the noted "diaphragm deflection" effect increases as the deflection increases.

With even larger diaphragm deflections, an additional effect is introduced which is commonly known as "ballooning". This effect causes the diaphragm shape itself to change, in that the rate of deflection at areas of large radii increase relative to areas at small radii. Depending upon the geometry of the capacitor plates, this effect may increase the slope of the transducer output, which is undesirable.

Figure 9:
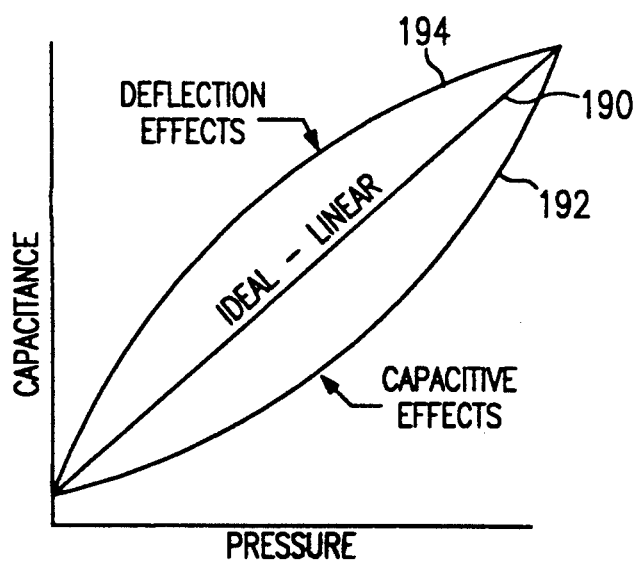
FIG. 9 is a graph depicting the relationship of the deflection and capacitance effects on a clamped diaphragm type of transducer.
Figure 6:
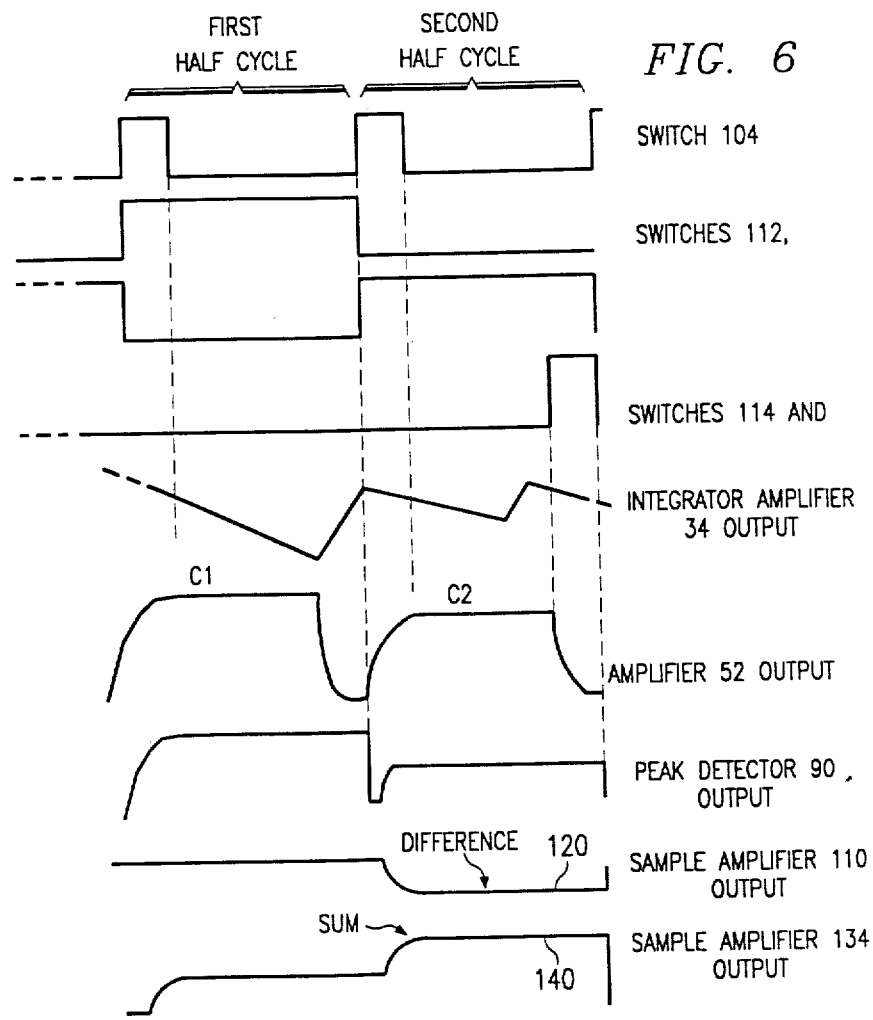
Figure 7:
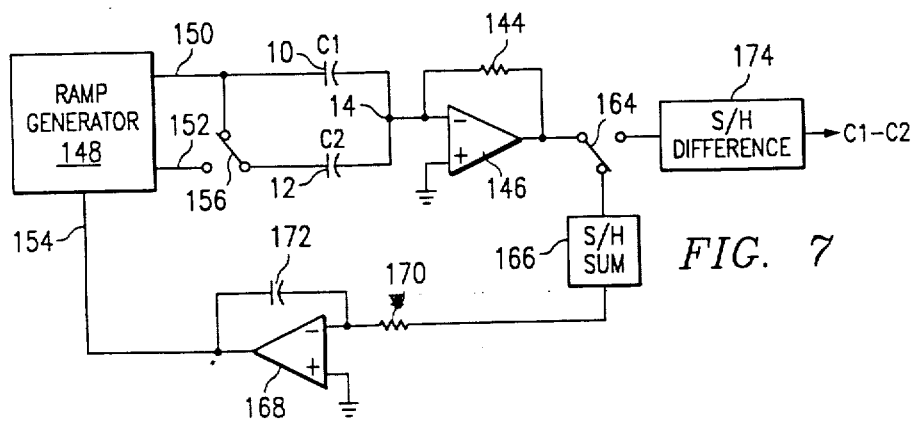

FIG. 9 illustrates a foregoing principles in graphical form. The horizontal axis represents input pressure to the transducer for deflecting the diaphragm membrane, while the vertical axis represents output capacitance resulting from such diaphragm deflection. Line 190 signifies an ideal transducer characteristic in which the output capacitance changes in a linear manner with regard to input pressure changes. As noted above, clamped diaphragm type transducers rarely exhibit such a linear characteristic. Line 192 illustrates the capacitive effects of various parameters of the transducer which tend to increase the output slope of the transducer. Line 194 indicates the effects caused by deflection characteristics of the clamped diaphragm transducer, which effects tend to decrease the output slope of the transducer.

According to an important aspect of the invention, linearization of a clamped diaphragm transducer can be achieved by carefully selecting parameters such that the deflection effects substantially track the capacitive effects, thereby resulting in a linear output characteristic of the transducer. In other words, the rate at which the output slope of the transducer increases with pressure due to capacitance effects should ideally be the same as the rate at which the output slope decreases with pressure due to the diaphragm deflection effects.

According to a preferred embodiment of the invention, the deflection effects of a transducer can be controlled by changing the diaphragm thickness. While other parameters may also relate to the deflection effects, it has been found in practice that the diaphragm thickness comprises a parameter which is easily controlled, and which predominates in the control of the deflection effects. In like manner, the capacitive effects of a transducer can be controlled by changing the gap between the transducer diaphragm and the fixed plates. Again, other transducer parameters are interrelated with the capacitive effects, however, the transducer gap is easily controlled during the manufacture of the transducer components. Substantially ideal linearization can be achieved from an inherently nonlinear transducer, and at that same time, sensitivity is not compromised, but rather is increased. Generally, the practical limitations on increased sensitivity comprise the tolerances required on the dimensions of the transducer parameters.

While the preferred and other embodiments of the invention have been disclosed with reference to specific transducer device and circuit fabrications and corresponding conversion methods, it is to be understood that many changes in detail may be made as a matter of engineering choices without departing from the spirit and scope of the invention, as defined by the appended claims.

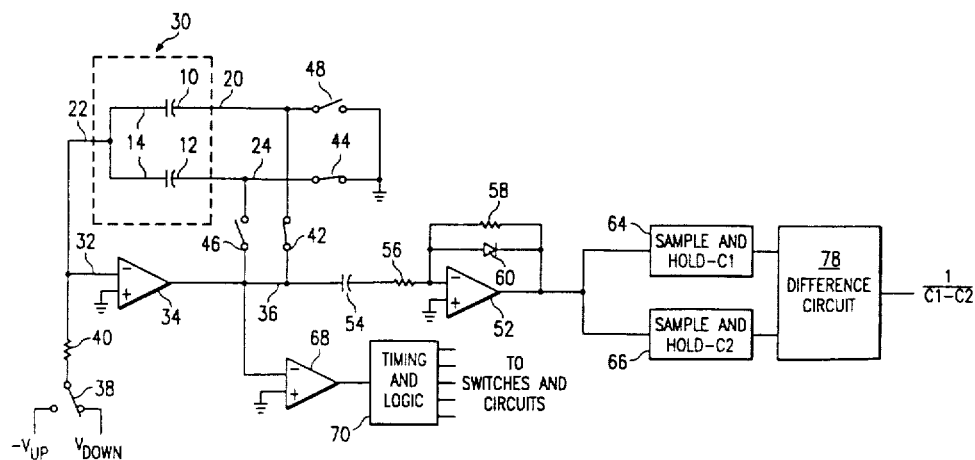

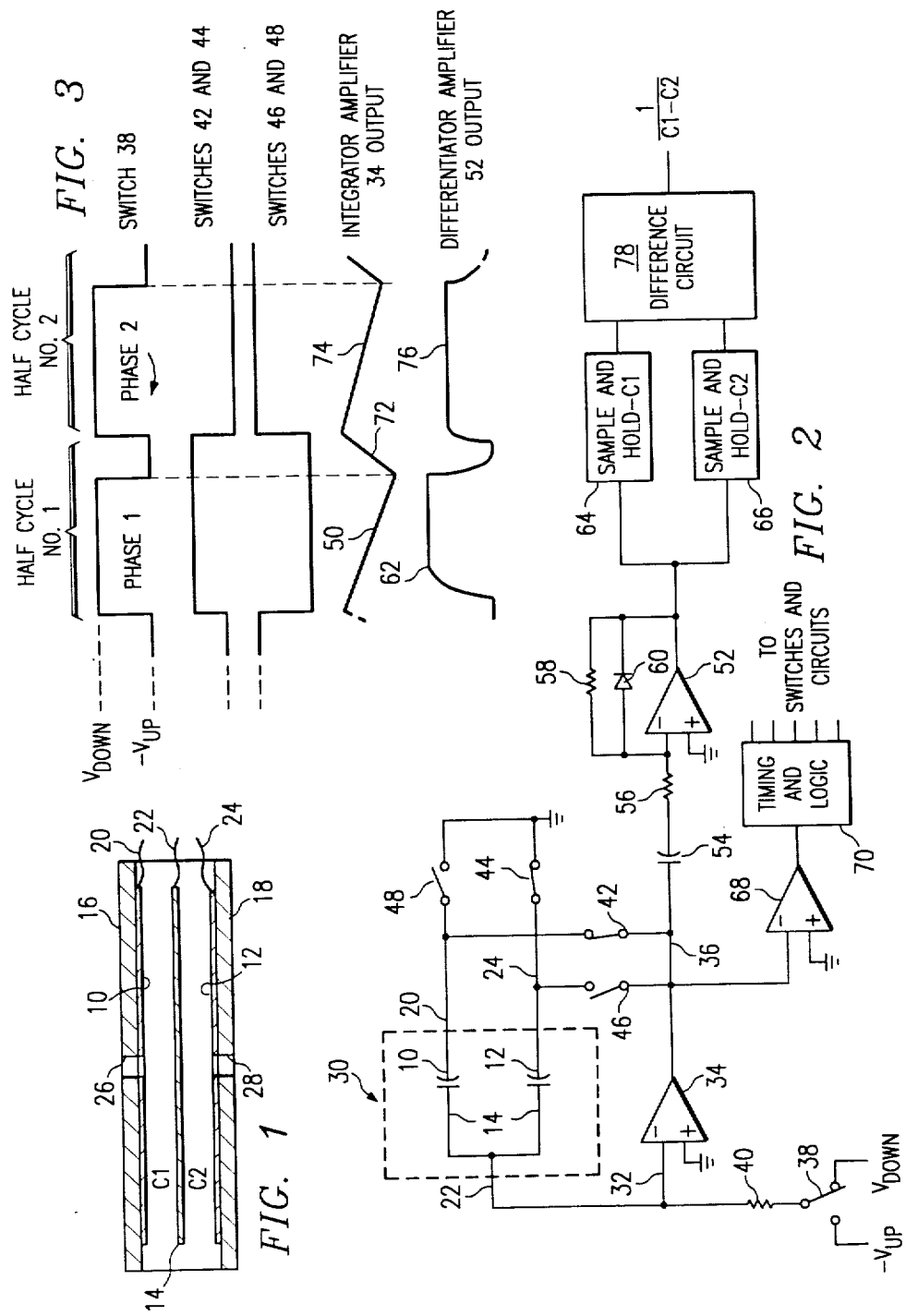

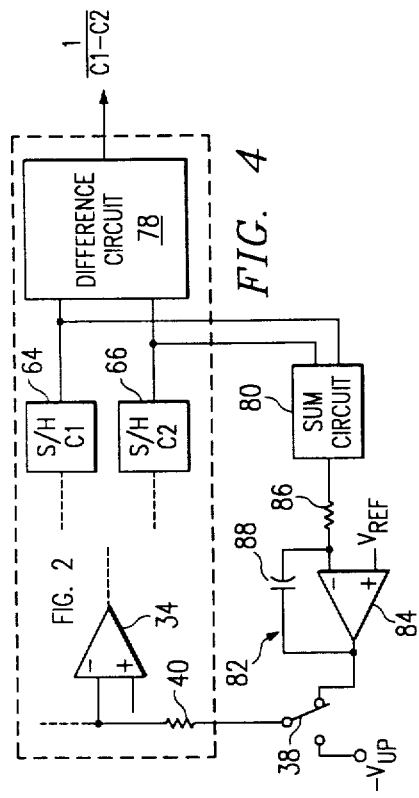
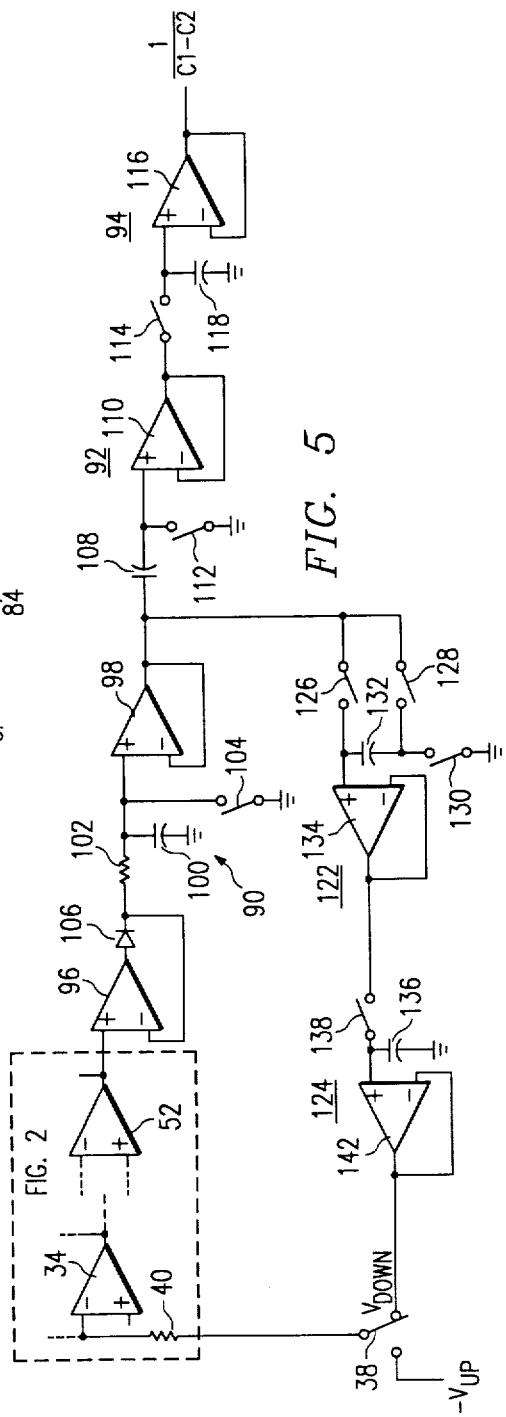

I claim:

1. Transducer apparatus, comprising:
   a first conductive plate;
   a second conductive plate;
   a member, mounted between said first and second plates such that at least a part of said member is movable with respect to said first and second plates;
   a transducer circuit connected to said transducer for producing a first ramp voltage having a slope proportional to a reciprocal capacitance between said first plate and said movable manner, and for producing a second ramp voltage having a slope proportional to a reciprocal capacitance between said second plate and said movable member;
   a circuit responsive to said ramp voltages for producing respective DC voltages proportional to said reciprocal capacitances; and
   a subtracting circuit responsive to said DC voltages for effectively subtracting representations of the reciprocal capacitances produced by said transducer circuit.

2. The transducer apparatus of claim 1, further comprising
   an integrator circuit defined by an amplifier with said transducer capacitances switchably connected as feedback around said amplifier, said amplifier being driven by one constant current pulse to provide said first ramp voltage and by another constant current pulse to produce said second ramp voltage.

3. The transducer apparatus of claim 2, further including a differentiator connected to an output of said integrator for producing pulses with amplitudes proportional to said reciprocal capacitances.

4. The transducer apparatus of claim 3, wherein said transducer circuit includes a common signal channel defined by said integrator and said differentiator for processing said reciprocal capacitances.

5. The transducer apparatus of claim 1, further including a feedback circuit for feeding back a signal which varies in such a manner as to maintain a sum of representations of the reciprocal capacitances substantially constant to reduce the effect of transducer and circuit scaling factors.

6. The transducer apparatus of claim 1, wherein said subtracting circuit comprises a circuit employing a capacitor having plates to which said reciprocal capacitance representations are switched to achieve a subtraction result.

7. The transducer apparatus of claim 1, further including a switching circuit for allowing reciprocal capacitance representations to be alternately processed by said transducer.

8. Transducer apparatus for measuring changes in capacitances C1 and C2 due to deflections of a movable member of a transducer, comprising:
   a generator circuit for driving said capacitances C1 and C2 with a signal;
   a switching circuit for connecting said capacitances C1 and C2 in such a manner that during one cycle said capacitances are driven together by said generator circuit to produce a summation signal, and during another cycle said capacitances C1 and C2 are driven together by said generator circuit to produce a subtraction signal; and
   a first storage circuit for temporarily storing a signal representative of said summation signal, and a second storage circuit for temporarily storing a signal representative of said subtraction signal.

9. The transducer apparatus of claim 8, wherein said second storage circuit defines a first sample and hold circuit for storing said subtraction signal, and wherein said first storage circuit defines a second sample and hold circuit for storing the summation signal.

10. The transducer apparatus of claim 9, wherein said summation sample and hold circuit produces a feedback signal coupled to said generator circuit for altering the signals generated by said generator circuit.

11. The transducer apparatus of claim 8, wherein said generator circuit produces an output triangular waveform and an inverted waveform thereof.

12. The transducer apparatus of claim 11, wherein said switching circuit is adapted to connect said capacitances C1 and C2 in parallel for driving with said triangular waveform to produce a summation signal.

13. The transducer apparatus of claim 12, wherein said switching circuit is adapted to connect said capacitances C1 and C2 in series for driving with said triangular and inverted triangular waveforms to produce said subtraction signal.

14. The transducer apparatus of claim 8, wherein said switching circuit is adapted for switching said generator circuit for driving said capacitances C1 and C2 such that a series of pulses are output from said transducer apparatus, with odd ordered pulses representing a summation signal and even ordered pulses representing a subtraction signal.

15. A circuit for measuring transducer capacitance in response to deflections of a movable diaphragm of a balanced differential transducer, comprising:
   a ramp generator for driving transducer capacitances C1 and C2 with a ramp voltage to produce at least one resulting signal representative o the capacitances C1 and C2;

a subtracting circuit for deriving a signal corresponding to a difference between said capacitances;

an adding circuit for deriving a signal corresponding to a summation of said capacitances; and a feedback circuit responsive to said summation signal for adjusting drive parameters of said ramp generator such that said subtracting circuit measures the difference between C1 and C2 substantially independently of scaling factor changes in said transducer and said circuit.

16. The circuit of claim 15, further including a differentiator circuit connected to said transducer capacitances and driven by said ramp generator.

17. A transducer circuit responsive to first and second measurement parameters of a capacitive type transducer, comprising:

a series signal channel comprising a front end and producing an electrical output signal representative of said measurement parameters; and a switching circuit for switchably connecting said measuring parameters with respect to said front end for producing alternate cycles in which said measurement parameters are alternately processed by said signal channel.

18. The transducer circuit of claim 17, wherein said signal channel comprises said differentiator having switchable transducer capacitors alternately connected thereto by said switching circuit to produce in said signal channel alternate representations of capacitance measurement parameters.

19. The transducer circuit of claim 17, further including an integrator circuit in said front end having switchable transducer capacitors alternately connected as feedback elements by said switching circuit to produce in said signal channel alternate representations of capacitance measurement parameters.

20. The transducer circuit of claim 17, wherein said signal channel produces an output defining an algebraic summation of the first parameter and the second parameter, a generator in said front end for driving a pair of transducer capacitances, and further including a circuit for effectively dividing said algebraic summation expression by modifying driving characteristics of said generator.

21. The transducer circuit of claim 17, wherein said switching circuit is effective to alternately connect a pair of transducer capacitances in parallel and then in series to produce alternate representations of capacitance summations and capacitance differences.

22. The transducer circuit of claim 21, wherein said switching circuit is effective to produce in one cycle an electrical signal having a characteristic corresponding to a sum of the transducer capacitances, and produce in an alternate cycle an electrical signal having a characteristic corresponding to a difference of the transducer capacitances.

23. The transducer circuit of claim 17, wherein said switching circuit is effective to alternately connect each of a pair of transducer capacitances during different cycles in said front end to produce an electrical representation of the capacitance thereof.

24. The transducer circuit of claim 23, wherein said signal channel further includes an integrator to which a pair of transducer capacitances are alternately switchably connected as feedback elements.

25. The transducer circuit of claim 24, wherein said signal channel is adapted to measure reciprocal capacitances of said transducer and process signals corresponding thereto.

* * * * *

UNITED STATES PATENT AND TRADEMARK OFFICE
CERTIFICATE OF CORRECTION

PATENT NO. : 5019783

DATED : May 28, 1991

INVENTOR(S) : Robert M. Cadwell

It is certified that error appears in the above-identified patent and that said Letters Patent is hereby corrected as shown below:

The title page should be deleted to appear as per attached title page.

Drawings   delete sheets 1 and 2, and substitute therefore the attached sheets 1, 2, and 3

Drawings   change the designation of Sheet 3 of 3 to a designation of Sheet 4 of 4

Signed and Sealed this

Sixteenth Day of February, 1993

*Attest:*

STEPHEN G. KUNIN

*Attesting Officer*    *Acting Commissioner of Patents and Trademarks*

United States Patent [19]

Cadwell

[11] Patent Number: 5,019,783

[45] Date of Patent: May 28, 1991

[54] PRECISION TRANSDUCER CIRCUIT AND LINEARIZATION METHOD

[75] Inventor: Robert M. Cadwell, Los Altos, Calif.

[73] Assignee: Dresser Industries, Inc., Dallas, Tex.

[21] Appl. No.: 304,359

[22] Filed: Jan. 30, 1989

[51] Int. Cl.⁵ .................................. G01R 27/26
[52] U.S. Cl. .................................. 324/662; 73/724; 324/678; 324/679
[58] Field of Search .......... 326/61 R, 60 R, 60 CD, 326/60 C, 661, 658, 662, 671, 678, 679; 73/718, 724

[56] References Cited

U.S. PATENT DOCUMENTS

| | | | |
|---|---|---|---|
| 4,054,833 | 10/1977 | Briefer | 324/679 |
| 4,092,696 | 5/1978 | Boesen et al. | 361/283 |
| 4,093,915 | 6/1978 | Briefer | 324/679 |
| 4,094,199 | 6/1978 | Holdren et al. | 73/517 B |
| 4,122,708 | 10/1978 | Maier | 73/136 A |
| 4,193,063 | 3/1980 | Hitt et al. | 324/60 C D X |
| 4,211,971 | 7/1980 | Kobayashi et al. | 324/61 R X |
| 4,292,632 | 9/1981 | Yeakley | 324/61 R X |
| 4,295,376 | 10/1981 | Bell | 73/724 |
| 4,336,718 | 6/1982 | Washburn | 73/517 B |
| 4,386,312 | 5/1983 | Briefer | 324/661 |
| 4,392,382 | 7/1983 | Myers | 73/724 X |
| 4,392,383 | 7/1983 | Bauerlen et al. | 73/724 |
| 4,398,194 | 8/1983 | Johnston | 324/60 C X |
| 4,509,007 | 4/1985 | Barsotti et al. | 324/60 C |
| 4,584,885 | 4/1986 | Cadwell | 73/862.61 |
| 4,791,352 | 12/1988 | Frick et al. | 324/60 CD |

Primary Examiner—Reinhard J. Eisenzopf
Assistant Examiner—Robert W. Mueller

[57] ABSTRACT

A method and apparatus for determining the extent of deflections of a movable diaphragm in a capacitive displacement type transducer. The transducer circuit is connected to a three terminal capacitive type transducer, and produces an output which is essentially of stray capacitances, circuit component tolerances and changes, and dimensional changes in the transducer elements caused by temperature changes. This is achieved by providing an output which is representative of the difference in the capacitances of the two transducer capacitors, nominalized by dividing by the sum of the capacitance reciprocals. The output of the transducer circuit thus represents the extent of the diaphragm deflection with all other transducer and circuit parameter variations removed.

25 Claims, 4 Drawing Sheets